(12) United States Patent
Cypher

(10) Patent No.: US 9,037,554 B2
(45) Date of Patent: May 19, 2015

(54) BLOOM BOUNDERS FOR IMPROVED COMPUTER SYSTEM PERFORMANCE

(75) Inventor: Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 995 days.

(21) Appl. No.: 12/494,874

(22) Filed: Jun. 30, 2009

(65) Prior Publication Data

US 2010/0332471 A1 Dec. 30, 2010

(51) Int. Cl.
*G06F 7/00* (2006.01)
*G06F 9/46* (2006.01)

(52) U.S. Cl.
CPC ..................... *G06F 9/467* (2013.01)

(58) Field of Classification Search
CPC .................................. G06F 17/3033
USPC ......................................... 707/698
See application file for complete search history.

(56) References Cited

U.S. PATENT DOCUMENTS

| | | | | |
|---|---|---|---|---|
| 2006/0130046 | A1* | 6/2006 | O'Neill | 717/168 |
| 2006/0248079 | A1* | 11/2006 | Braica | 707/7 |
| 2008/0104046 | A1* | 5/2008 | Singla et al. | 707/4 |
| 2009/0092252 | A1* | 4/2009 | Noll et al. | 380/277 |

OTHER PUBLICATIONS

B. Bloom, "Space/time Tradeoffs in Hash Coding with Allowable Errors," CACM, 13(7):422-426, Jul. 1970.
Amir Roth, "Store Vulnerability Window (SVW): A Filter and Potential Replacement for Load Re-Execution," Journal of Instruction Level Parallelism, vol. 8, 2006, 22 pages.
A. Roth, "Store Vulnerability Window (SVW): Re-Execution Filtering for Enhanced Load Optimization," In Proceedings 32nd International Symposium on Computer Architecture, Jun. 2005, 11 pates.
A. Yoaz, M. Erez, R. Ronen, and S. Jourdan, "Speculation Techniques for Improving Load-Related Instruction Scheduling," In Proceedings 26th Annual International Symposium on Computer Architecture, May 1999, 12 pages.
Dave Dice and Nir Shavit, "What Really Makes Transactions Faster?" TRANSACT, 2006, 11 pages.
Dave Dice, Ori Shalev, and Nir Shavit, "Transactional Locking II," DISC'2006, Stockholm, 15 pages.

(Continued)

*Primary Examiner* — Ajith Jacob
(74) *Attorney, Agent, or Firm* — Meyertons, Hood, Kivlin, Kowert & Goetzel, P.C.

(57) ABSTRACT

A system and method for space and time efficient bound calculation is disclosed. The method comprises inserting a plurality of key/value pairs into a "Bloom bounder", each key/value pair comprising a key and a value. For each pair, the inserting includes calculating a plurality of hash values, each calculated by applying a different one of a plurality of hash functions to the key, and selectively updating one or more data arrays based on the plurality of hash values and the value received key/value pair. A bound may then be determined for a given query key by analyzing information in the one or more data arrays to determine a bound value, such that for every received key/value pair with a key matching the query key, the corresponding value is less than or equal to the bound value.

9 Claims, 8 Drawing Sheets

(56) References Cited

OTHER PUBLICATIONS

"Bloom filter," http://en.wikipedia.org/wiki/Bloom_filter, retrieved May 10, 2011.

Zhengjun Cao, "How to Launch a Birthday Attack Against DES," Computer Sciences Department, Universite Libre de Bruxelles, Belgium, 2008, 10 pages.

* cited by examiner

BLOOM BOUNDERS FOR IMPROVED COMPUTER SYSTEM PERFORMANCE

BACKGROUND

Today's computer systems are constantly being pushed to achieve ever-greater system performance. Computer engineers and software developers leverage a variety of techniques and approaches to increase performance. For example, software engineers may expend considerable effort optimizing computer code by utilizing space-efficient and/or time-efficient data structures and algorithms for solving particular computing problems. Research into general solutions (e.g., data structures, algorithms) aimed at solving commonly arising software problems has been prolific, though more solutions are regularly needed as new problems arise.

Meanwhile, rather than optimizing for a particular application, computer architects push system performance by concentrating on producing hardware that can execute more instructions in less time. Much of this effort has focused on exploiting instruction-level parallelism in applications. For example, over the years, computer processor speeds have been increased by utilizing deeper instruction pipelines, out-of-order and/or speculative instruction execution, effective branch prediction, and various other techniques. By exploiting instruction-level parallelism, computer systems may effectively mask the effects of high-latency instructions on system performance. However, more efficient techniques for exploiting instruction-level parallelism in computer architectures are needed.

In addition to producing techniques for exploiting instruction-level parallelism, in recent years, system architects have also concentrated on producing systems capable of exploiting thread-level parallelism, such as by utilizing multi-threaded and/or multi-processor systems. A multi-processor system may comprise multiple physical and/or logical processors, each capable of concurrently executing a different thread of instructions. In some systems, multiple concurrent threads may each access and/or operate on common memory locations (i.e., shared memory). For correct execution, such systems may require various concurrency control mechanisms, which may limit thread-level parallelism in some instances. Much research in recent years has concentrated on developing concurrency control techniques for ensuring correct program execution while also maximizing the amount of thread-level parallelism exposed to the system. For example, transactional memory is one such concurrency control technique. By exposing more thread-level parallelism, a multi-threaded system may be able to execute more efficiently and thereby increase performance. However, further optimizations for concurrency control techniques, such as transactional memory, are required.

One common problem faced by both software engineers and computer architects in implementing high-performance systems, is that of quickly testing set membership. For example, a system may be configured to observe a series of values over time and then, given a query value, quickly and efficiently determine whether the query value was among the observed values (i.e., whether the query value is a member of the set of observed values).

Some systems may solve such a problem by employing a "Bloom filter," which is a probabilistic data structure for testing set memberships. Traditionally, a Bloom filter defines a binary array (initialized to all 0's) and K hash functions, each configured to output hash values that are valid indices into the binary array. A Bloom filter may "observe" a given element (of a set) by performing an insert operation on the given element. The insert operation includes calculating K indices into the binary array by applying each of the K hash functions to the element and using the output of each hash function as a separate index into the binary array. The insert operation then ensures that the binary array holds a value of 1 at each of the K indices. To determine whether a given element is in the set, a Bloom filter may be configured to again calculate K indices into the binary array by applying each of the K hash functions to the element. If the binary array is 1 at all of the K indices, then the Bloom filter determines that the element may be a member of the set (i.e., may have been previously inserted).

A Bloom filter may allow false positives but not false negatives. That is, Bloom filter may only definitively conclude that a given element is not in the set of observed elements, but not that it is in the set. However, this guarantee is sufficient for many scenarios.

SUMMARY

A common problem faced by both software engineers and computer architects is that of determining effective bounds on observed data in a time and space-efficient manner. In one general formulation of this problem, a system may observe a number of values, each associated with a given key (i.e., key/value pairs). Later, the system may be required to determine a maximum bound for a given a key, such that none of the observed values associated with the same key are greater than (or alternatively, less than) the determined bound.

According to various embodiments, a "Bloom bounder" may be implemented to improve the time and/or space efficiency of computer systems by providing an efficient system and method for determining solutions to bounding problems (e.g., maximum or minimum bounds), including those faced within various parts of a computer system.

In some embodiments, the method may comprise inserting a plurality of key/value pairs into a Bloom bounder, each key/value pair comprising a key and a value. For each pair, the inserting includes calculating a plurality of hash values, each calculated by applying a different one of a plurality of hash functions to the key, and selectively updating one or more data arrays based on the plurality of hash values and the value received key/value pair. A bound may then be determined for a given query key by analyzing information in the one or more data arrays to determine a bound value, such that for every received key/value pair with a key matching the query key, the corresponding value is less than or equal to the bound value.

In some embodiments, each of the plurality of hash functions may be associated with a corresponding one of the one or more data arrays. In such embodiments, selectively updating may include, for each of the plurality of hash values determining the corresponding data array for the hash function used to calculate the hash value, determining whether the value of the received key/value pair is greater than a value stored in the determined data array at an index of the data array corresponding to the hash value, and if so, replacing the value stored in the determined data array at the index with the value of the received key/value pair.

A bound may then be determined for a given query key by analyzing information in the one or more data arrays to determine a bound value, such that for every received key/value pair with a key matching the query key, the corresponding value is less than or equal to the bound value.

In some embodiments, the Bloom bounder may be used to determine a bound value for the given query key by first initializing the bound value to a default value (e.g., largest possible value) and for each of the plurality of hash functions, determining an index for the data array corresponding to the hash function by applying the hash function to the received query key, determining a value stored in the data array at the determined index, and if the determined stored value is less than the bound value, setting the bound value equal to the determined stored value.

Figure 1:
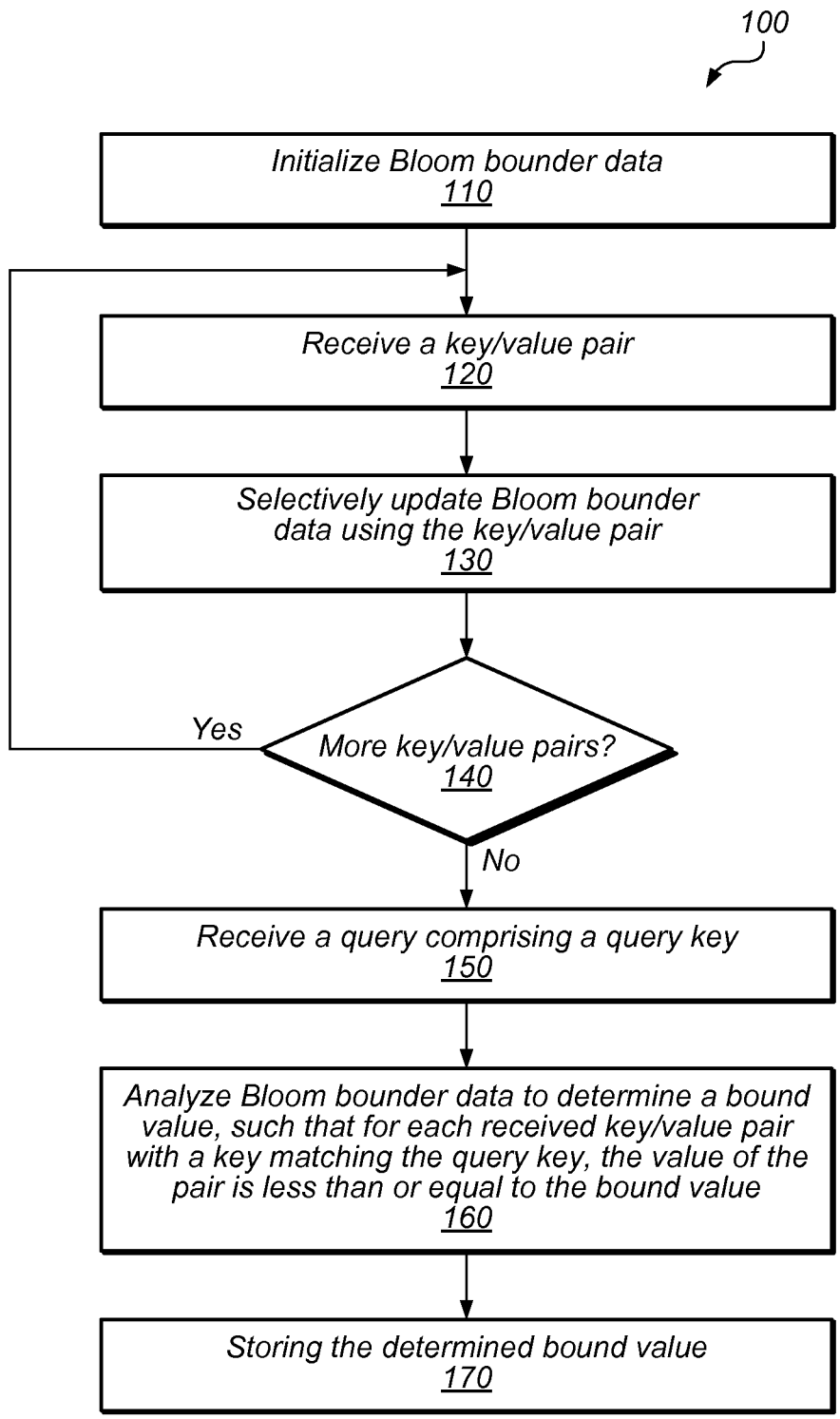
FIG. 1 illustrates a method for determining and maximum or minimum bound using a Bloom bounder, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Computer hardware and software engineers are constantly searching for new and better techniques for increasing the performance of computer systems and applications. For example, software engineers may expend considerable effort optimizing computer code by utilizing space-efficient and/or time-efficient data structures and algorithms for solving particular computing problems. Meanwhile, computer architects attempt to design systems capable of exploiting higher degrees of instruction-level and/or thread-level parallelism.

One such common problem faced by both software engineers and computer architects is that of determining effective bounds on observed data in a time and space-efficient manner. In one general formulation of this problem, a system may observe a number of values, each associated with a given key (i.e., key/value pairs). Later, the system may be required to determine a maximum bound for a given key, such that none of the observed values associated with the same key are greater than (or alternatively, less than) the determined bound.

According to various embodiments, a "Bloom bounder" may be implemented to improve the time and/or space efficiency of computer systems by providing an efficient system and method for determining solutions to bounding problems, including those faced within various parts of a computer system. As used herein, a Bloom bounder includes dedicated hardware and/or an article of manufacture including a computer-readable medium storing program instructions usable to determine, given a particular key, a maximum (and/or minimum) bound for a plurality of key/value pairs; as will be described, the Bloom bounder implements a plurality of hash functions and includes one or more data arrays. An exemplary Bloom bounder is described below with reference to FIG. 2.

In one embodiment, a Bloom bounder includes memory in a computer system that stores a plurality of hash functions (e.g., hashing module 220 in FIG. 2) and a plurality of data arrays (e.g., data array module 210 in FIG. 2), where each of the plurality of hash functions is usable to return a value that is a valid index into a corresponding one of the plurality of data arrays. In certain embodiments, a Bloom bounder also includes memory storing groups of program instructions (one embodiment of "modules" in FIG. 2) that are computer-executable to perform functions such as inserting key/value pairs into the data arrays, querying the data arrays to determine a maximum (or minimum) bound, comparing data values, etc. In another embodiment, a Bloom bounder includes dedicated hardware configured to perform a plurality of hashing functions, memory configured to store data for a plurality of data arrays, and dedicated circuitry configured to perform functions such as inserting, querying, etc. In short, any suitable combination of hardware, software, firmware, and memory may be used to implement a Bloom bounder.

Various Bloom bounders and variations of Bloom bounders, as described herein, may be implemented and used by software and/or hardware systems. In various embodiments, a Bloom bounder may comprise various components, which may each be implemented in hardware and/or software.

FIG. 1 illustrates a computer-implemented method for determining bounds using a Bloom bounder, according to some embodiments. According to the illustrated embodiment, method 100 may begin by first initializing Bloom bounder data, as in step 110. In some embodiments, initializing Bloom bounder data may comprise storing one or more default values into storage associated with the Bloom bounder. For example, step 110 may comprise storing default values in a computer memory, in computer registers, and/or in other hardware structures associated with a Bloom bounder. In some embodiments, step 110 may comprise allocating memory in a computer memory system for one or more components or subcomponents to be used by the Bloom bounder. In some embodiments of method 100, step 110 need not be performed, but performing this step may sometimes result in more accurate bounds under some circumstances.

Method 100 comprises receiving a key/value pair, as in step 120. As used herein, a key/value pair comprises a key (which may be any identifier) and a data value associated with that key. As used herein, the "value of a key/value pair" refers to the data value portion of the pair. For example, one key/value pair may identify a city and population of the city. That is the key may be a city name and the value of the key/value pair may be a number indicating the population of the city. In various embodiments, a key may comprise any number, letter, string, some combination, or any other identifier. In various embodiments, the data value may be of various types (e.g., number, letter, string, etc.), wherein data values of a particular data type are "comparable" to other data values of that particular data type (e.g., other data values received in iterations of step 120). As used herein, a data value of a particular type is "comparable" to another if it can be compared by computer hardware and/or software to other data values of that type and judged to be less than, greater than, or equal to the other data value. In some embodiments, comparable data values may have a natural ordering (i.e., numbers). In other embodiments, arbitrary other orderings may be imposed on data values as described below with respect to comparator module 250.

In response to receiving a key/value pair in 120, method 100 comprises selectively updating Bloom bounder data using the key/value pair, as in step 130. In various embodiments, step 130 may include various types of analysis of the key/value pair and/or of Bloom bounder data (e.g., data stored in memory by the Bloom bounder, and/or in other storage associated with the Bloom bounder, including hardware structures, registers, etc.). In some instances, step 130 may comprise updating one or more values of Bloom bounder data in response to the analysis. In some instances, the system may determine in step 130 that no Bloom bounder data needs to be updated in response to receiving the key/value pair. For example, if the system analyzes Bloom bounder data and determines that it is already indicative of the key/value pair being received, it may be configured to no perform any further updates in response to having received the key/value pair.

According to the illustrated embodiment, any number of key/value pairs may be received, as indicated by the affirmative exit from step 140 to step 120. As described above, in some embodiments, every value received of a particular data type is comparable to the other received values of that type. In some embodiments, the system may repeat selective updating 130 for each new key/value pair received in 120. In some embodiments, multiple key/value pairs may be received at one time (i.e., in one iteration of step 120). In such embodiments, step 130 may perform analysis and selective updates in response to the multiple key/value pairs.

According to the illustrated embodiment, after one or more key/value pairs are received and processed (as in steps 120-140), the system may receive a query comprising a query key, as in step 150. In response to receiving the query, the system may be configured to analyze Bloom bounder data to determine a maximum bound value, such that for each received (in step 120) key/value pair with a key matching the query key, the value of the pair is less than or equal to the maximum bound value. In alternate embodiments, the system may be configured to determine a minimum bound value, such that for each received key/value pair with a key matching the query key, the value of the pair is greater than or equal to the minimum bound value.

In some embodiments, a key "matching" the query key may be one that is equal to the query key (e.g., the key and query key are identical identifiers). In various embodiments, a key matching the query key may be one that matches along any defined criteria (e.g., numeric values in a common range, all characters, even numbers, etc.). In a different embodiment, any suitable criteria may be defined for determining which keys match a given query key.

According to method 100, after determining a bound value, the system may store the determined bound, as in step 170, such as in a memory location or register of the computer system. In various embodiments, the system may then be configured to receive more key/value pairs and/or to determine more bound values in response to receiving more queries.

Figure 2:
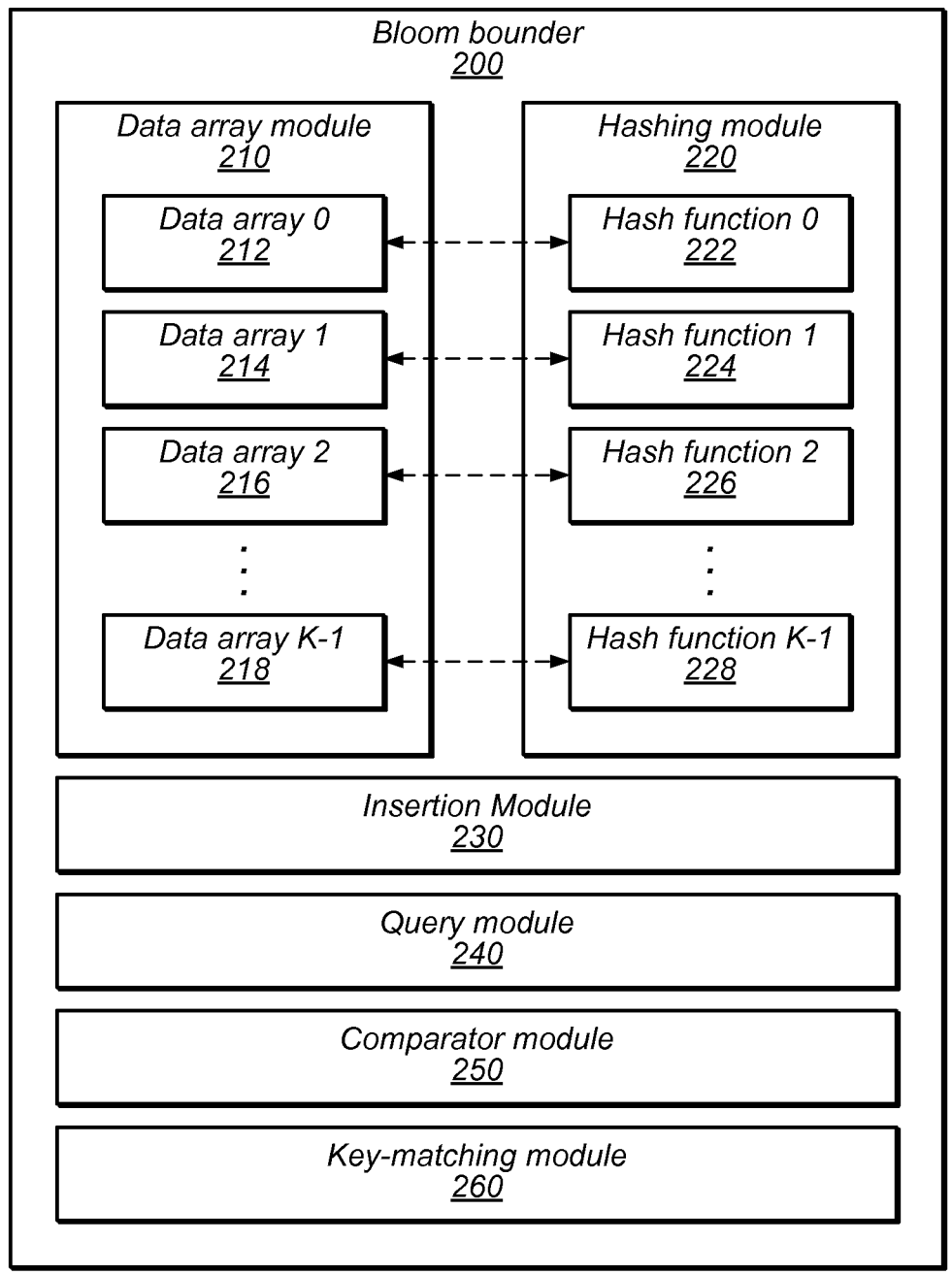
FIG. 2 is a block diagram illustrating various components of and/or associated with a Bloom bounder, according to some embodiments.

FIG. 2 is a block diagram illustrating various components of and/or associated with a Bloom bounder, according to some embodiments. Any component of Bloom bounder 200 may be implemented in hardware, software, or any combination thereof. In various embodiments Bloom bounder 200 may comprise greater or fewer components than those pictured in FIG. 2. In various embodiments, various illustrated components may be implemented as part of Bloom bounder 200, as part of other components, and/or as separate components. Given the benefit of this disclosure, different variations will become apparent to those skilled in the art.

According to the illustrated embodiment of FIG. 2, Bloom bounder 200 may comprise a data array module 210, which may comprise one or more data arrays, such as data arrays 212-218. In the illustrated embodiment, data array module 210 comprises K data arrays 212-218. In various embodiments, each data array 212-218 may comprise an array or other data structure capable of storing a respective data item of a given type at each of M indices (i.e., slots). For example, in one embodiment, data array 212 may store up to M unique elements, each at a different index (slot) of the data array.

In some embodiments, every data array 212-218 may be configured to store data values that are comparable to every other data value stored in the other indices and in the other data arrays. For example, in some embodiments, each slot of each array may be configured to store a numerical value, which may have a natural ordering with respect to other numerical values (e.g., 3 is greater than 2). In other embodiments, each slot may be configured to store a character, such as an alphabetic character, which may also have a natural ordering with respect to other alphabetic characters (e.g., 'a' is before 'c').

In various embodiments, each slot may be configured to store other values, such as those that do not have a natural ordering, but may be comparable using various comparison logic. For example, in some embodiments, a comparator module, such as 250, may be configured to impose any ordering on data values stored in data array module 210. Comparator module 250 may be configured to determine that any data value stored in data arrays 210-218 is either greater than, less than, or equal to any other value stored in the data arrays. In various embodiments, the ordering imposed by comparator module 250 may or may not correspond with a natural ordering of the elements. For example, in one embodiment, comparator module 250 may impose a reverse ordering on numeric values. In other embodiments, comparator 250 may impose an ordering where no natural order exists. For example, comparator 250 may determine that the value "yellow" is less than the value "red" but more than the value "green". For purposes of simplicity in explaining the following embodiments, data arrays 212-218 are described as storing numerical values and that comparator module 250 is configured to impose a natural ordering on the numerical values. However, given the benefit of this disclosure, one skilled in the art will appreciate that any comparable values and/or ordering may be used.

According to the illustrated embodiment of FIG. 2, Bloom bounder 200 may comprise hashing module 220, which may define at least K unique hashing functions, such as hash functions 222-228. In some embodiments, each hash function may be associated with one of data arrays 212-218. For example, in the illustrated embodiment of FIG. 2, there is a one-to-one correlation between data arrays 212-218 and hash functions 222-228 (i.e., hash function 222 is associated with data array 212, hash function 224 is associated with data array 214, etc). In other embodiments, multiple hash functions may be associated with a single array.

In some embodiments, each hash function 222-228 may be configured to accept as input at least one data value, perform one or more operations using the data value, and determine an output value that is a valid index into the data array with which the hash function is associated. For example, in the illustrated embodiment, if data array 212 contains M indices, then associated hash function 222 may be configured to accept an input value and in response, output an index value between 0 and M−1 (or between 1 and M, etc.). In one such example, if the input value is a number, the output of hash function 222 may be the input value modulo M. Various other hash functions are possible. In some embodiments, hash functions that produce more uniformly distributed output values may be desirable.

According to the illustrated embodiment of FIG. 2, Bloom bounder 200 comprises an insertion module 230, which may be configured to receive any number of key/value pairs and to selectively modify one or more values in data array module 210 in response to an analysis of those received key/value pairs. In some embodiments, insertion module 230 may perform steps analogous to 120-140 of FIG. 1. More detailed embodiments of insertion module 230 are described below with respect to FIG. 3.

According to the illustrated embodiment of FIG. 2, Bloom bounder 200 comprises a query module 240, which may be configured to receive a query comprising a query key. In response to receiving the query, the query module may be configured to return a maximum (or minimum) bound with respect to the key/value pairs received by the insertion module. In some embodiments, query module 240 may perform steps analogous to 150-170 of FIG. 1. More detailed embodiments of query module 240 are described below with respect to FIG. 4.

In some embodiments, Bloom bounder 200 comprises a key-matching module, such as 260. In some embodiments, query module 240 may employ key-matching module 260 to determine whether a given query key matches one or more keys of one or more key/value pairs, as in 160. In some embodiments, key-matching module 260 may be configured to determine that only identical keys match, while in other embodiment, module 260 may be configured to impose any arbitrary matching criteria. For example, in one embodiment, key-matching module 260 may be configured to determine that two numeric keys match if they are in the same range and/or are above or below a defined threshold.

Figure 3:
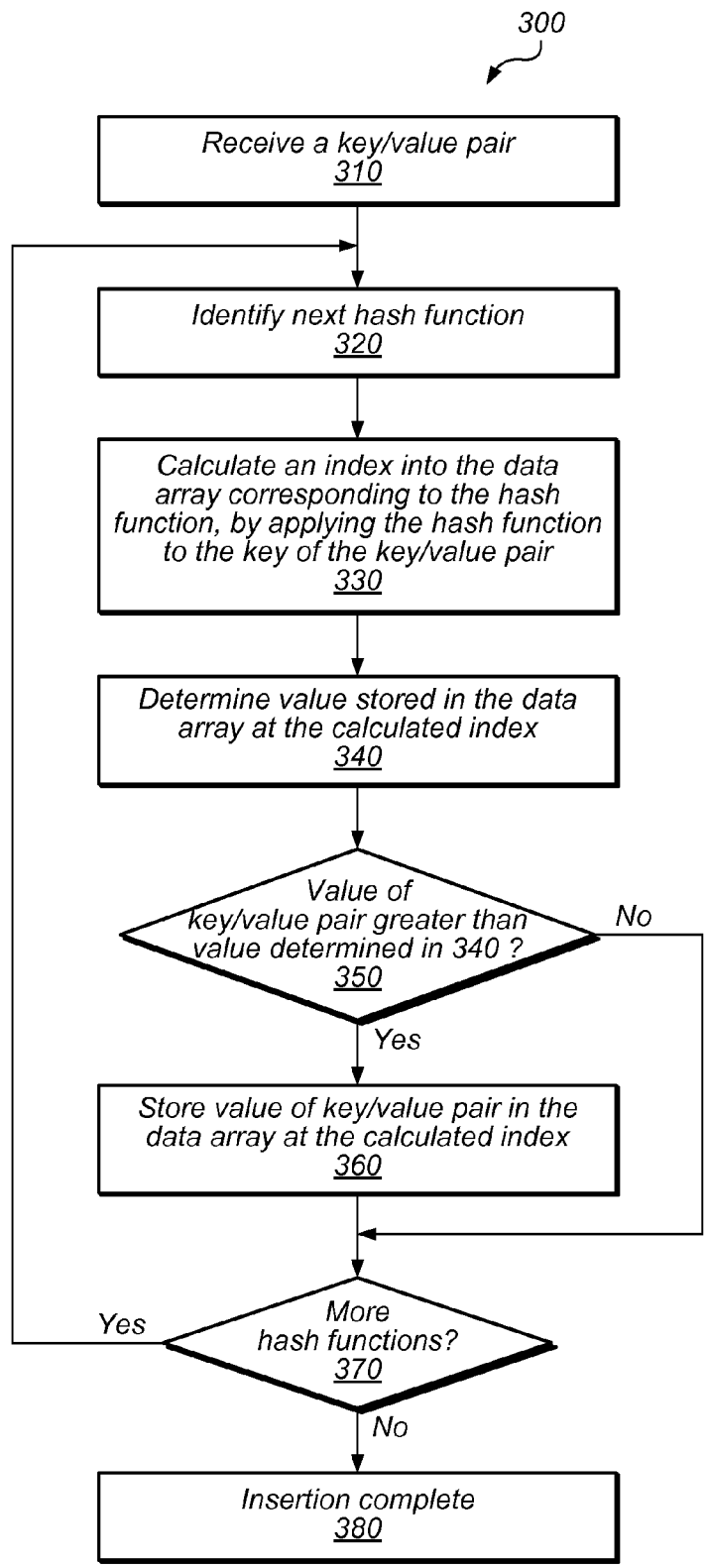
FIG. 3 is a flow diagram illustrating a method for receiving a key/value pair and selectively updating Bloom bounder data, according to some embodiments.

FIG. 3 is a flow diagram illustrating a method for receiving a key/value pair and selectively updating Bloom bounder data, according to some embodiments. In some embodiments, the illustrated method may be performed by an insertion module of a Bloom bounder configured to determine maximum bounds, such as insertion module 230. The method may correspond to steps 120-130 of FIG. 1.

According to the illustrated embodiment, method 300 may begin by receiving a key/value pair, as in 310. In some embodiments, receiving a key/value pair in 310 may correspond to the step of receiving a key/value pair in 120 of FIG. 1.

According to the illustrated embodiment, method 300 may then include analyzing and/or selectively updating data in various data arrays of the Bloom bounder (e.g., data arrays 212-218). This process may include identifying the next hash function (e.g., the first time through method 300, the "next hash function" may be hash function 0), as in 320, calculating an index into the data array corresponding to that hash function, and applying the hash function to the key of the received key/value pair, as in 330. For example, with respect to FIG. 2, in executing step 330, insertion module 230 may be configured to receive a key/value pair and calculate an index into data array 212 by applying hash function 222 (which is associated with data array 212) to the key of the received key/value pair.

According to the illustrated embodiment, the insertion module may then read the value stored at the calculated index of the data array that corresponds to the hashing function, as in 340. If the value of the key/value pair is greater than that stored at the calculated index, as indicated by the affirmative exit from 350, then the insertion module may be configured to store the received data value of the key/value pair in the data array at the calculated index, as in 360. Otherwise, the insertion module may skip step 360, as indicated by the negative exit from 350.

According to the illustrated embodiment, if more hash functions exit, as indicated by the affirmative exit from 370, then the method of 320-360 may be repeated for each hash function, as indicated by the feedback loop from step 370 to step 320. In some embodiments, steps 320 to 360 may be performed for multiple ones of the hash functions in parallel with the others. For example, steps 320-360 may be performed in parallel for hash functions that each correspond to different data arrays, since such a configuration presents minimal data conflict concerns. For example, in some embodiments that use a Bloom bounder such as Bloom bounder 200, the insertion method of 320-360 may be performed in parallel for all hash functions, since there is a one to one relationship between hash functions and data arrays.

According to the illustrated embodiment, once all hash functions have been processed, as indicated by the negative exit from 370, the insertion method completes, as indicated in step 380. In an alternate embodiment, wherein a minimum bound is to be determined, rather than a maximum bound, decision 350 may be adapted as to decide whether the value determined in 340 is greater than the value of the key value pair rather than less than.

As an illustrative example, assume that in 310, the system receives a key/value pair wherein the key is A and the value is 5. In 320, the system may identify hash function 222 of FIG. 2 as the next hash function. In 330, the system may apply hash function 222 to the key A to get an index (e.g., 32) into the data array corresponding to hash function 222 (data array 212). In 340, the system may determine that the value stored in data array 212 at index 32 is 3. In 350, the system may determine that the value stored in the array (3) is less than the value of the key/value pair (5), and therefore, store the value (5) in data array 212 at the calculated index (32), as in 360. However, if the value stored in data array 212 at index 32 is greater than 5, then the system would not update the value stored at index 32. To complete the insertion, the system may be configured to repeat these steps (320-360) for each of hash functions 224-228, as indicated by the feedback loop from 370 to 320.

Figure 4:
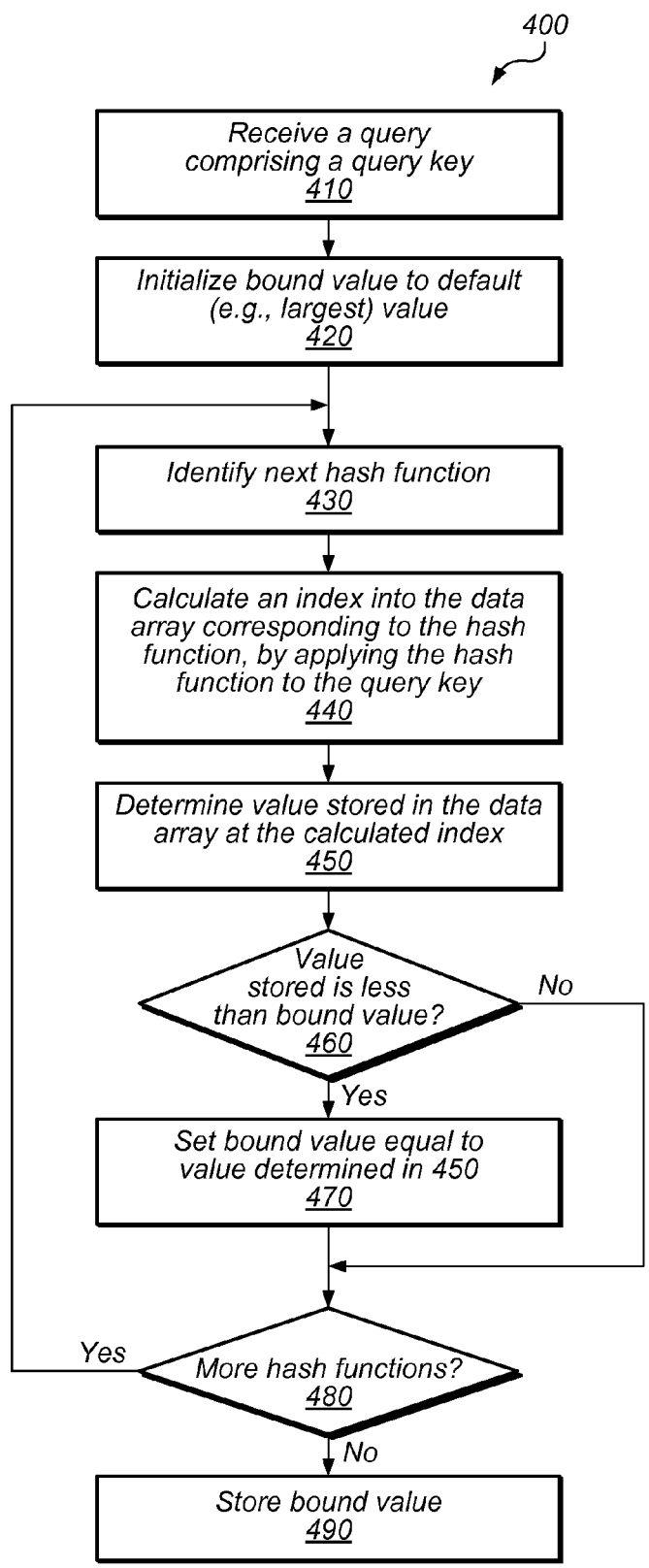
FIG. 4 is a flow diagram illustrating a method for determining a maximum bound, using a Bloom bounder as described herein, according to some embodiments.

FIG. 4 is a flow diagram illustrating a method for determining a maximum bound, using a Bloom bounder as described herein, according to some embodiments. In some embodiments, the illustrated method may be performed by a query module of a Bloom bounder configured to determine maximum bounds, such as query module 240 of FIG. 2. In some embodiments, method 400 may correspond to steps 150-170 of FIG. 1.

According to the illustrated embodiment, method 400 may begin by receiving a query comprising a query key, as in 410. Method 400 may then comprise initializing an initial bound value to a default value, as in 420. For example, in some embodiments wherein an upper (i.e., maximum) bound is sought, the default value may be the highest value possible. In other embodiments, wherein a lower (i.e., minimum) bound is sought, the default value may be the lowest value possible. In various embodiments, the lowest and highest values possible may depend on hardware restrictions, number formats, and/or domain-specific considerations (for example, if the values of the key/value pairs represent months of the year, then a minimum of 1 and maximum of 12 may suffice).

According to the illustrated embodiment, method 400 may then include, for each hash function, identifying the next hash function (as in 430, which depends in one embodiment on the current number of times step 430 has been performed for a given instance of method 400) and calculating an index into the data array associated with that hash function by applying the hash function to the received query key, as in 440. For each calculated index into each data array, method 400 further comprises determining the value stored in the data array at that index (as in 450) and, if the value stored is less than the bound value (as indicated by the affirmative exit from 460), setting the bound value equal to the stored value (as in 470). In alternate embodiments wherein a lower bound is desired, decision 460 may be adapted such that if the value stored is greater than the bound value, then the bound value is set equal to the stored value.

According to the illustrated embodiment, steps 430-470 may be repeated for each hash function, as indicated by the affirmative exit from 480. When all hash functions have been seen, as indicated by the negative exit from 480, the query module may be configured to store the bound value in a memory location and/or hardware register of the system. Accordingly, using insertion and query methods such as methods 300 and 400, a system may compute bounds on observed key/value pairs.

To continue the illustrative example from above, assume that the Bloom bounder is configured to hold integer values and that the key/value pair A/5 had been inserted as described earlier. In 410, the system may receive a query comprising the query key A. In 420, it may initialize a bound value (e.g., a variable) to hold the largest possible integer value (INT_MAX). In 430, the system may identify hash function 222 as the next hash function. In 430, the system may apply hash function 222 to the query key A, resulting in the index 32. In 450, the system may determine that the value stored in index 32 of data array 212 is 5. In 460, the system may determine that the value stored (5) is less than the bound value (INT_MAX), and therefore, the system sets the new bound value to 5, as in 470. In the illustrated embodiment, steps 430-470 may be repeated for every hash function 224-228, as indicated by the feedback loop from 480 to 430.

In some such embodiments, Bloom bounder data may include a full-sized "largest-value-seen" field, which comprises sufficient bits to hold any value of any key/value pair received by the insertion module. The largest-value-seen field may be configured to hold the highest value inserted into any of the data arrays since the last initialization. For example, when storing a value of the key/value pair in a data array, as in 360 of FIG. 3, the insertion module may be configured to also determine whether the value of the key/value pair is larger than the value currently held in the largest-value-seen field, and if so, to replace the value in the largest-value-seen field with the value of the key/value pair. Thus, in such embodiments, the largest-value-seen field holds the highest value (L) inserted into any data array by the insertion module.

In some embodiments that include a largest-value-seen field, Bloom bounder data may be made more space-efficient by limiting the amount of data (i.e., bits) that each slot of each data array (e.g., 212-218) holds. For example, the space requirements of Bloom bounder data may be reduced by configuring each slot of each data array to store only b bits (e.g., 16), even when values of key/value pairs comprise more than b bits (e.g., 32-bit integers). In such embodiments, the system may be configured to store only the lowest order b bits of each value in the data array. However, when comparing a value stored in a data array to another value (e.g., as in 350 or 460), the system may be configured to interpret each data array value as the highest value with the same b lowest-order bits as the data array value, but that is also less than or equal to L. For example, if L=16, a data array value of 3 may be interpreted as 15. Such embodiments may be more space efficient and may be particularly useful when the values inserted are monotonically increasing, as is the case in many applications.

In various embodiments, calculating bounds on observed data using one or more Bloom bounders may increase the time-efficiency and/or space-efficiency of a computer system. In some embodiments, a Bloom bounder may be used to enable more effective exploitation of instruction-level and/or of thread-level parallelism. For example, one common technique for increasing parallelism is that of speculative execution, wherein one or more instructions (e.g., load operations from memory) are executed speculatively and then, if later discovered to be invalid, may be rolled back and/or re-executed.

The general principle of speculative execution can be leveraged for both instruction-level and thread-level parallelism. For example, to hide latency in processor pipelines (instruction-level parallelism), load operations may be executed before one or more store operations that precede the load in program order. Later, the load operation may be validated and potentially re-executed if the system detects that one or more of the store operations has changed the value that was loaded by the speculative load. In another example, to increase thread-level parallelism, transactional memory systems may be configured to speculatively execute a series of instructions (including load and/or store operations) as a single atomic block (i.e., a transaction) and to either commit the transaction or to roll back and/or re-execute the instructions if the execution is discovered to be invalid, for example, because of one or more memory accesses of another thread. According to some embodiments, speculative mechanisms may be implemented more efficiently using Bloom bounders, as described herein, than has been traditionally possible.

Figure 5:
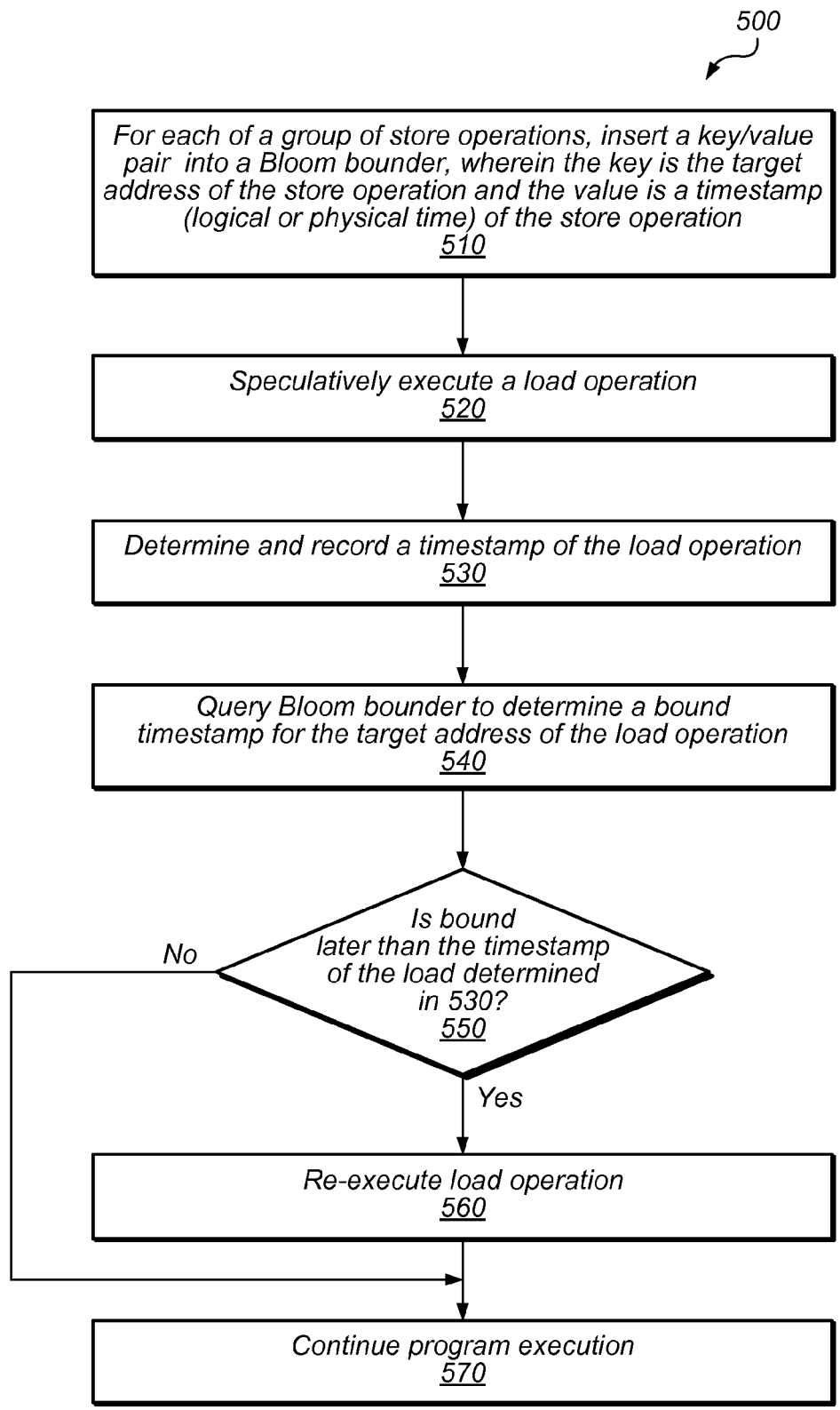
FIG. 5 is a flow diagram illustrating a method for implementing various speculative execution mechanisms using a Bloom bounder, according to some embodiments.

FIG. 5 is a flow diagram illustrating a method for implementing various speculative execution mechanisms using a Bloom bounder, according to some embodiments. In different embodiments, method 500 may be executed by any combination of hardware and/or software mechanisms.

According to the illustrated embodiment, for each of a group of store operations, the system may be configured to insert a key/value pair into a Bloom bounder (e.g., using insertion module 230), wherein the key is the target memory address of the store operation and the value is a timestamp of the store operation, as in 510. In various embodiments, the timestamp may reflect actual physical time (e.g., system time). In other embodiments, the timestamp may reflect a logical time, such as that of a logical clock. In various embodiments, a logical clock may refer to any mechanism for capturing chronological, causal, and/or other orderings between entities or events. In various embodiments, the group of store operations may comprise all or some portion of store operations issued, queued, executed, and/or otherwise relevant to system execution.

According to method 500, the system may then speculatively execute a load operation, as in 520, and determine and record a timestamp of the load operation, as in 530. In various embodiments, the timestamp may comprise either a physical or logical timestamp. According to method 500, the system may then query the Bloom bounder to determine a bound timestamp for the load operation's target address, as in 540. For example, in one embodiment, this may comprise sending a query to query module 240, wherein the query key of the query is the target address of the load operation.

According to method 500, once the bound timestamp is determined, as in 540, the system may determine whether the bound is greater than the timestamp of the load, as in 550. According to the illustrated embodiment, if the bound is greater than the timestamp of the load, as indicated by the affirmative exit from 550, then the load may be invalid, and may therefore be re-executed, as in 560, before program execution continues, as in 570. Otherwise, if the bound is not greater than the timestamp of the load, as indicated by the negative exit from 550, in some embodiments, the load may be valid and program execution may continue, as in 570.

In some embodiments a variation of method 500 may be implemented for efficient load-speculation in processor pipelines. Load instruction scheduling and execution may be performed using speculative loads, by various dynamically-scheduled processors. As discussed above, speculative loads may be validated after being speculatively executed or rolled back and/or re-executed if found to be invalid. For example, load validation may include re-executing the load operation in program order and detecting whether the re-execution loads the same value as the original execution. If not, then the speculative load may be invalid and recovery may be initiated (e.g., re-execution of one or more program instructions dependent on the value loaded by the speculative load). However since load validation using re-execution may consume system resources (e.g., cache bandwidth), it may be desirable to reduce the number of load validations performed during program execution.

Figure 6:
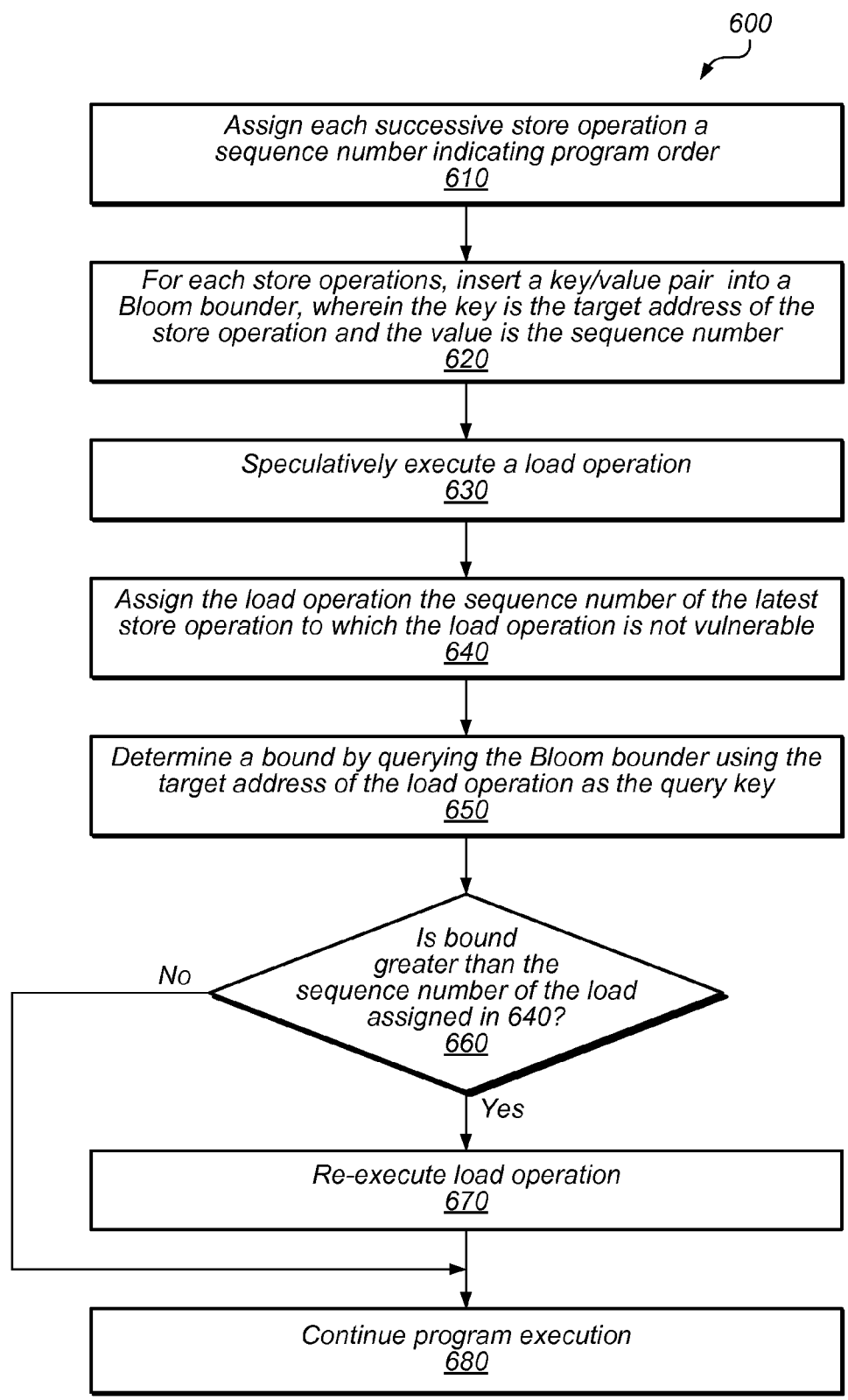
FIG. 6 is a flow diagram illustrating a method for performing efficient speculative load execution using a Bloom bounder, according to some embodiments.

FIG. 6 is a flow diagram illustrating a method for performing efficient speculative load execution using a Bloom bounder, according to some embodiments. In different embodiments, method 600 may be executed by any combination of hardware and/or software mechanisms, such as by a superscalar computer system.

According to the illustrated embodiment, each successive store operation may be assigned a sequence number, which may indicate its relative place in program order with respect to other store operations, as in 610. For example, successive store operations may receive monotonically increasing sequence numbers. In such embodiments, the sequence numbers may be treated as timestamps of a logical clock. According to FIG. 6, for each store operation assigned a sequence number, the system may be configured to insert a key/value pair into a Bloom bounder, wherein the key is the target address of the store operation and the value is the sequence number, as in 620.

According to the illustrated embodiment, the system may speculatively execute a load operation, as in 630. In some embodiments, the system may be configured to assign the load operation the sequence number of the latest in-flight store operation to which the load operation is not vulnerable, as in 640. In different embodiments, various criteria may be used to determine to which store operations the load operation is vulnerable. For example, in one embodiment, the load operation may be vulnerable to all store operations that precede the load operation in program order. In such an embodiment, the latest store operation to which the load operation is not vulnerable may be the last store operation to execute (e.g., commit to cache).

In further embodiments, further criteria may be used to determine to which store operations a load may be vulnerable. For example, in some embodiments, a load operation may be configured to utilize a load forwarding mechanism wherein the load operation loads a value from an in-flight store operation that precedes the load operation in program order. In such an embodiment, the load operation may only be vulnerable to in-flight store operations that both precede the load operation and succeed the store operation from which the load forwarded its value. In various embodiments, additional criteria may be applied, such as whether preceding stores are from the same thread, etc.

According to the illustrated embodiment, when the load operation arrives at the head of the load or load/store queue, the system may be configured to verify the speculative execution of the load. According to method 600, verifying the speculative load may include determining a bound by querying the Bloom bounder using the target address of the load operation as the query key, as in 650. According to method 600, if the bound is not greater than the sequence number of the load, as indicated by the negative exit from 660, then the system may determine that the speculative load execution is valid and may continue program execution, as in 680. Otherwise, as indicated by the negative exit from 660, then the system may determine that the load may be in conflict with one of the stores and may re-execute the load, as in 670, to detect possible mis-speculation. In some embodiments, if the value from the re-executed load is different than the value from the speculated load, then mis-speculation may be confirmed and the system may be configured to take some recovery action, such as flushing the load and/or subsequent instructions (which may depend on the load value) from the pipeline before continuing program execution, as in 680.

In some embodiments a variation of method 500 may be implemented for efficient speculative load execution in transactional memory systems. Transactional memory systems may be implemented in software (STM), hardware (HTM), or some combination thereof. Transactional memory systems may allow a block of program instructions to be executed in a multi-threaded system as a single atomic block, or transaction, with respect to the execution of other threads in the system. For example, in some transactional memory systems, if a given transaction loads a value from a memory address and another thread modifies the value in that memory address before the transaction commits (i.e., finishes), then the transaction may need to abort (e.g., roll back the effect of its executed instructions and reattempt execution).

Some transactional memory systems utilize transactional locking techniques whereby each memory address is associated with a versioned lock, which contains a version number. The version number may be thought of as a timestamp of a logical or physical clock. When a store operation stores a value in a memory location, the transactional memory system may be configured to increase the version number of the versioned lock associated with that memory location. In such systems, when a load is executed inside of a transaction, the transactional memory system may record the version number of the lock associated with the loaded memory address and, before committing the transaction, re-read the version number of the lock to confirm that it has not changed during transactional execution. If the version number did change, then the system may be configured to roll back the transaction and/or retry. However, keeping track of and retrieving version numbers for each memory location may be time and space consuming, particularly when values are evicted from cache and into main memory.

Figure 7:
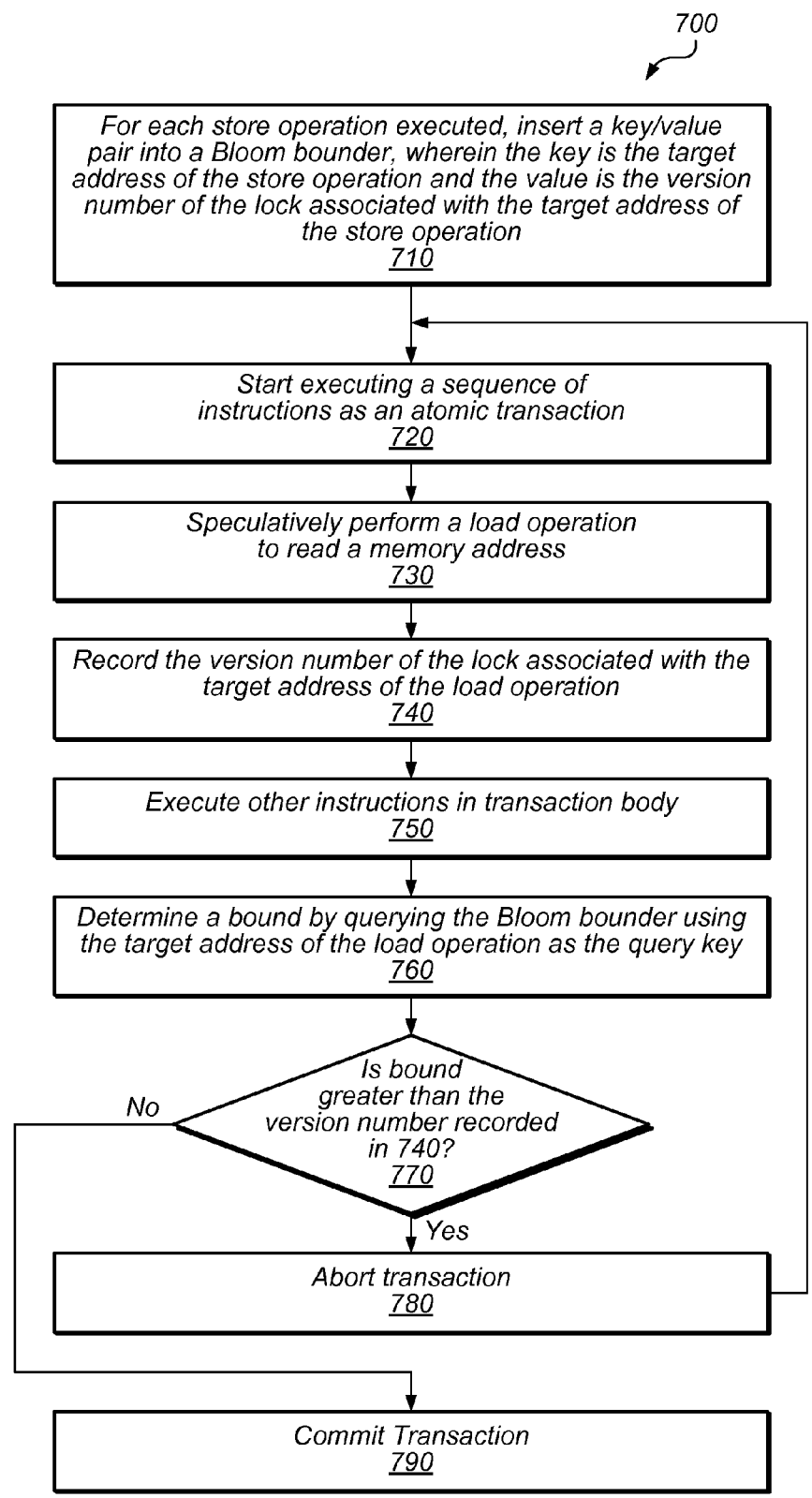
FIG. 7 is a flow diagram illustrating a method for performing efficient load validation in transactional memory systems using a Bloom bounder, according to some embodiments.

FIG. 7 is a flow diagram illustrating a method for performing efficient load validation in transactional memory systems using a Bloom bounder, according to some embodiments. In different embodiments, method 700 may be executed by any combination of hardware and/or software mechanisms, such as by a transactional memory system utilizing a transactional locking scheme.

According to the illustrated embodiment, for each store operation executed, the system may be configured to insert a key/value pair into a Bloom bounder, wherein the key is the target address of the store operation and the value is the version number of the store operation execution, as in 710. In such an embodiment, the version number may be treated as a timestamp of a logical clock. In some embodiments, the version number may comprise a timestamp of a physical clock.

Method 700 may then comprise starting to execute a sequence of instructions as an atomic transaction, as in 720, wherein the transaction includes speculatively performing a load operation to read a memory address, as in 730. Along with executing the load operation, the system may be configured to record the version number of the lock associated with the target address of the load operation, as in 740. The transactional memory system may be configured to then execute the remainder of the transaction body, as in 750.

According to the illustrated embodiment, during the commit phase of the transaction, the transactional memory system may be configured to determine a bound by querying the Bloom bounder using the target address of the load operation as the query key, as in 760. If the bound is greater than the version number of the load recorded in 740, as indicated by the affirmative exit from 770, then the memory location may have been modified since the transaction speculatively executed the load operation. In such a case, the transactional memory system may be configured to abort the transaction, as in 780, and re-attempt execution, as indicated by the feedback loop from 780 to 720. In this embodiment, since re-execution of the transaction comprises re-execution of the load operation in 730, this transactional execution comprises a step analogous to 560 of method 500 ("re-execute load operation"). In the illustrated embodiment, if the bound is not greater than the version number for the load recorded in 740, as indicated by the negative exit from 770, then the system may determine that no other thread has modified the value stored in the target memory address of the load instruction since the load was speculatively performed in 730. In such a case, the transactional memory system may be configured to validate any other loads and/or stores and if successful, to commit the transaction, as in 790.

Figure 8:
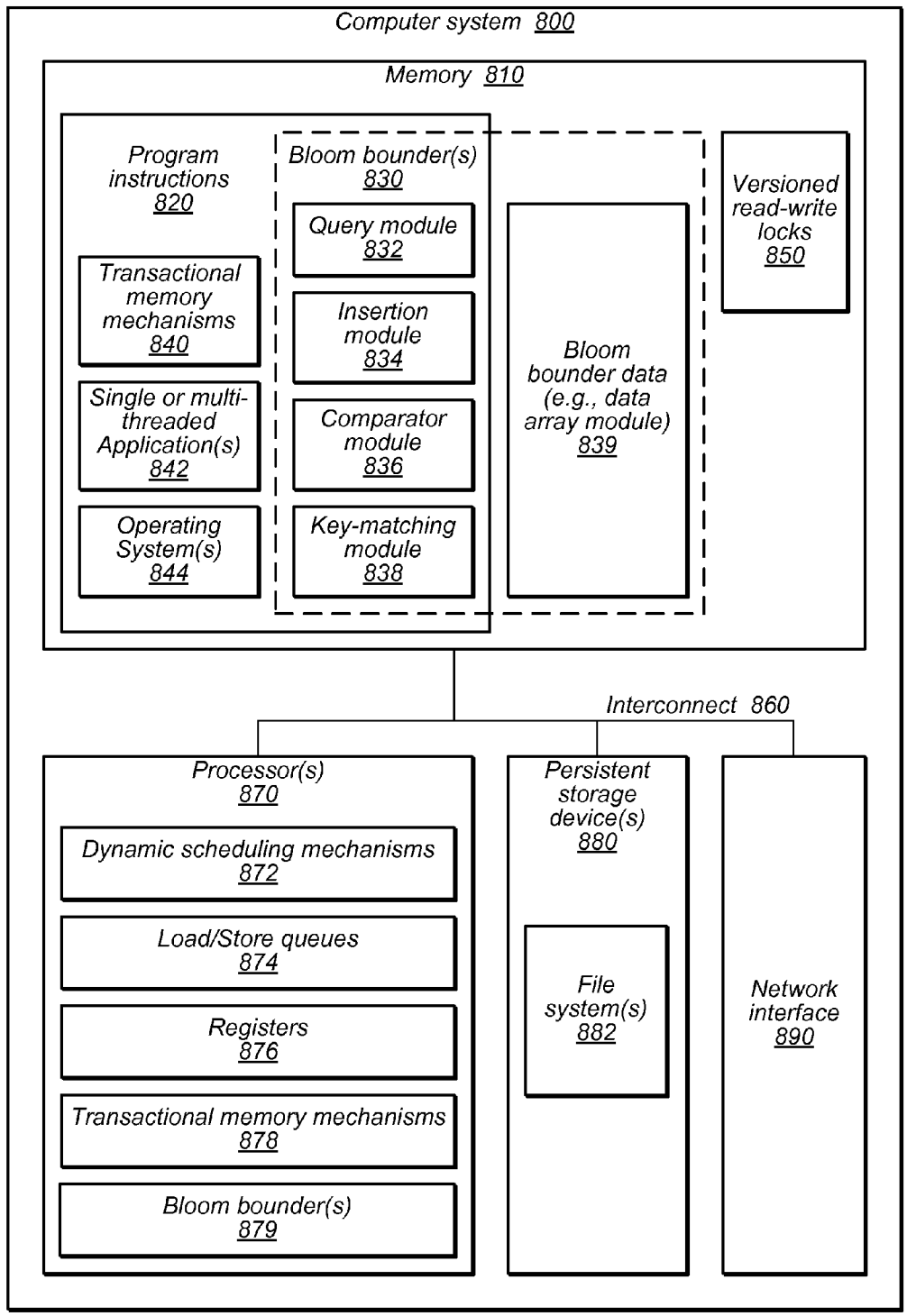
FIG. 8 illustrates one embodiment of a computer system configured to implement one or more Bloom bounders, according to some embodiments.

FIG. 8 illustrates one embodiment of a computer system configured to implement one or more Bloom bounders, as described herein. Computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 800 may include one or more processors 870, each of which may include multiple cores, any of which may be single or multi-threaded (e.g., simultaneous multi-processing, Hyperthreading™, etc.). In some embodiments, processors 870 may include dynamic scheduling mechanisms 872, such as those capable of performing load speculation using Bloom bounders, as described herein. In some embodiments, processors 870 may include load, store, and/or load/store queues, such as 874, for holding in-flight memory operations in the processor pipeline. Processors 870 may also include registers 876 for storing data values, such as bounds and/or data array values. In some embodiments, processors 870 may include any number of transactional memory mechanisms 878, which may be part of a hardware transactional memory system or a hybrid (hardware/software) transactional memory system. In some embodiments, processors 870 may also include a hardware implementation (or partial hardware implementation) of a Bloom bounder 879, as described herein. For example, in some embodiments, Bloom bounder 879 may be used by dynamic scheduling mechanisms 872 for speculative load validation as described herein.

The computer system 800 may also include one or more persistent storage devices 880 (e.g. optical storage, magnetic storage, hard drive, tape drive, solid state memory, etc), which may store files, for example, by using a file system, such as file system 882. Computer system 800 may include one or more memories 810 (e.g., one or more of cache, SRAM, DRAM, RDRAM, EDO RAM, DDR 10 RAM, SDRAM, Rambus RAM, EEPROM, etc.). Computer system 800 may include one or more network interfaces 890 for transmitting and receiving data. Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 870, storage device(s) 8800, network interface 890 and system memories 810 may be coupled to system interconnect 860. One or more of the system memories 810 may contain program instructions 820. Program instructions 820 may be encoded in platform native binary, any interpreted language such as Java™ byte-code, or in any other language such as C/C++, Java™, etc or in any combination thereof.

Program instructions 820 may include program instructions executable to implement one or more transactional memory mechanisms 840, which may be part of a software or hybrid transactional memory system. In some embodiments, program instructions 820 may also be executable to implement one or more single or multi-threaded applications 842, operating systems 844, and Bloom bounders 830. In various embodiments, any of transactional memory mechanisms 840, applications 842, operating system 844, and/or any other program or applications implemented as part of program instructions 820, may be configured to utilize one or more Bloom bounders, such as 830.

According to the illustrated embodiment, Bloom bounder 830 may comprise one or more program instruction modules (e.g., 832-838) and Bloom bounder data 839 in system memory 810. According to the illustrated embodiment, program instructions 820 may be executable to implement a query module 832, insertion module 834, comparator module 836, and key-matching module 838, as described herein. In various embodiments, one or more of these modules may be combined and/or implemented in hardware rather than by program instructions 820.

According to the illustrated embodiment Bloom bounder 830 may further comprise Bloom bounder data 839, such as data array module 210 in FIG. 2. In some embodiments, data array module may comprise both Bloom bounder data 839 and program logic implemented by program instructions 820, such as access logic to Bloom bounder data 839.

In some embodiments, such as those wherein transactional memory mechanisms 840 and/or 878 implement a transactional locking protocol, memory 810 may comprise versioned read-write locks 850, as described herein.

The systems and mechanisms as described herein may be provided as an article of manufacture that may include a computer-readable storage medium having stored thereon instructions that may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of tangible medium suitable for storing program instructions. In addition, program instructions may be communicated using intangible media-optical, acoustical or other form of propagated signal (e.g., carrier waves, infrared signals, digital signals, etc.).

Although the embodiments above have been described in considerable detail, numerous variations and modifications will become apparent to those skilled in the art once the above disclosure is fully appreciated. For example, determining bounds is a common requirement in artificial intelligence applications. It is intended that the following claims be interpreted to embrace all such variations and modifications.

What is claimed:

1. A system comprising:
    one or more processors; and
    a memory coupled to the one or more processors and having program instructions stored therein that are executable by the one or more processors to:
        for each of a group of store operations, insert a key/value pair into a set of key/value pairs stored in the memory, wherein the key is a target memory address of the store operation and the value is a physical or logical timestamp of the store operation, wherein for each key/value pair, said inserting comprises:
            calculate a plurality of hash values, each of which is calculated by applying a different one of a plurality of hash functions to the key of the key/value pair; and
            selectively update a plurality of data arrays stored in the memory, wherein the data arrays are selectively updated based on the plurality of hash values and the value of the key/value pair;
        for a load operation speculatively executed by the one or more processors relative to one of the group of store operations:
            determine a timestamp of the load operation;
            determine a bound value of a timestamp of a target memory address of the load operation by querying the set of key/value pairs stored in the memory using the target memory address of the load operation as a query key, wherein said querying comprises analyzing information in the plurality of data arrays to determine the bound value, such that for each of the set of key/value pairs with a key matching the target memory address of the load operation, the bound value is a timestamp that is before or the same as the timestamp of the target memory address, wherein said analyzing uses the plurality of hash functions; and
            wherein in response to determining that the bound value is later than the timestamp corresponding to the load operation, the one or more processors are configured to re-execute the load operation.

2. The system of claim 1, wherein the timestamps are of a logical clock indicating program order.

3. The system of claim 1, wherein each of the plurality of hash functions is associated with a corresponding one of the plurality of data arrays, and wherein said selectively updating comprises, for each of the plurality of hash values:
    determining the corresponding data array for the hash function used to calculate the hash value;
    determining whether the value of the key/value pair is greater than a value stored in the determined data array at an index of the data array corresponding to the hash value; and
    in response to determining that the value of the key/value pair is greater than the value stored in the determined data array at the index of the data array corresponding to the hash value, replacing the value stored in the determined data array at the index with the value of the key/value pair.

4. The system of claim 3, wherein the memory further comprises a first location storing a value indicating the largest value of the set of key/value pairs; and
    wherein said selectively updating comprises:
        in response to determining that the value of the key/value pair is greater than the largest value indicated by the value of the first location, modifying the value of the first location to indicate the value of the key/value pair.

5. The system of claim 4, wherein:
    each slot of the determined data array is configured to hold at most a first number of bits;
    the value of the key/value pair comprises a second number of bits greater than the first number of bits;
    said determining whether the value of the key/value pair is greater than the value stored in the determined data array comprises determining whether the value of the key/value pair is greater than an interpreted value, wherein the interpreted value is equal to the highest value that is no higher than the value indicated by the first location, and wherein a first number of lower order bits of the interpreted value match the first number of bits stored in the data array at the index; and
    wherein said replacing comprises storing a first number of lower order bits of the value of the key/value pair in the data array at the index.

6. The system of claim 3, wherein said analyzing comprises:
    initializing the bound value to a default value; and
    updating the bound value, said updating comprising, for each of the plurality of hash functions:
        determining an index for the data array corresponding to the hash function by applying the hash function to the query key;
        determining a value stored in the data array at the determined index; and
        in response to the determined stored value being less than the bound value, setting the bound value equal to the determined stored value; and
    wherein the bound value determined by said analyzing is the bound value produced as a result of performing said updating for each of the plurality of hash functions.

7. A method, comprising:
    for each of a group of store operations performed by a computer system, the computer system inserting a key/value pair into a data structure stored in a memory, wherein the key is a target memory address of the store operation and the value is a physical or logical timestamp of the store operation, wherein for each key/value pair, said inserting comprises:
  calculating a plurality of hash values, each of which is calculated by applying a different one of a plurality of hash functions to the key of the key/value pair;
  selectively updating a plurality of data arrays stored in the memory, wherein the plurality of data arrays are selectively updated based on the plurality of hash values and the value of the key/value pair;
the computer system speculatively executing a load operation that is after at least one of the groups of store operations in program order, wherein said executing occurs before the at least one store operation is executed by the computer system;
the computer system determining a timestamp of the load operation;
the computer system determining a timestamp bound value of a target memory address of the load operation by querying the data structure using the target memory address of the load operation as a query key, wherein said querying comprises analyzing information in the plurality of data arrays to determine the timestamp bound value of the target memory address, such that for each of the key/value pairs with a key matching the query key, the determined timestamp bound value is a timestamp that is before or the same as the timestamp of the target memory address, wherein said analyzing uses the plurality of hash functions; and
in response to determining that the timestamp bound value corresponding to the target memory address of the load operation is later than the timestamp corresponding to the load operation, the computer system re-executing the load operation.

8. The method of claim 7, wherein each of the plurality of hash functions is associated with a corresponding one of the plurality of data arrays, and wherein said selectively updating comprises, for each of the plurality of hash values:
  determining the corresponding data array for the hash function used to calculate the hash value; and
  in response to determining that the value of the key/value pair is greater than a value stored in the determined data array at an index of the data array corresponding to the hash value, replacing the value stored in the determined data array at the index with the value of the key/value pair.

9. The method of claim 8, wherein said analyzing comprises:
  initializing the timestamp bound value to a default value; and
  updating the timestamp bound value, said updating comprising, for each of the plurality of hash functions:
    determining an index for the data array of the plurality of data arrays corresponding to the hash function, wherein the index is determined by applying the hash function to the query key;
    determining a value stored in the data array at the determined index; and
    in response to the determined value stored in the data array at the determined index being less than the timestamp bound value, setting the timestamp bound value equal to the determined stored value; and
  wherein the timestamp bound value determined by said analyzing is the timestamp bound value produced as a result of performing said updating for each of the plurality of hash functions.

* * * * *